United States Patent
Chen et al.

(10) Patent No.: US 8,251,408 B2
(45) Date of Patent: Aug. 28, 2012

(54) BATTERY COVER LATCH MECHANISM AND PORTABLE ELECTRONIC DEVICE USING SAME

(75) Inventors: Jin-Lian Chen, Shenzhen (CN); Yung-Chang Yen, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 563 days.

(21) Appl. No.: 12/482,546

(22) Filed: Jun. 11, 2009

(65) Prior Publication Data

US 2010/0024304 A1   Feb. 4, 2010

(30) Foreign Application Priority Data

Jul. 30, 2008   (CN) .......................... 2008 1 0303207

(51) Int. Cl.
*E05C 19/06*   (2006.01)
*E05C 1/02*   (2006.01)
(52) U.S. Cl. ............ 292/80; 292/81; 292/137; 292/145; 292/DIG. 11; 292/DIG. 37

(58) Field of Classification Search .................... 292/80, 292/81, 87, 89, 137, 145, 163, DIG. 11, DIG. 37
See application file for complete search history.

(56) References Cited

U.S. PATENT DOCUMENTS

| | | | | |
|---|---|---|---|---|
| 5,626,374 | A * | 5/1997 | Kim | 292/170 |
| 6,068,307 | A * | 5/2000 | Murphy | 292/302 |
| 6,076,869 | A * | 6/2000 | Chen et al. | 292/202 |
| 6,762,928 | B2 * | 7/2004 | Lo | 361/679.58 |
| 7,050,294 | B2 * | 5/2006 | Chiu et al. | 361/679.27 |
| 7,050,295 | B2 * | 5/2006 | Kang | 361/679.58 |
| 7,181,238 | B2 * | 2/2007 | Chiang | 455/556.1 |
| 7,420,799 | B2 * | 9/2008 | Wang | 361/679.27 |
| 7,441,813 | B2 * | 10/2008 | Qin et al. | 292/163 |
| 7,789,438 | B2 * | 9/2010 | Shi et al. | 292/163 |
| 7,789,439 | B2 * | 9/2010 | Zhao et al. | 292/163 |

* cited by examiner

*Primary Examiner* — Carlos Lugo
(74) *Attorney, Agent, or Firm* — Altis Law Group, Inc.

(57) ABSTRACT

A battery cover latch mechanism is configured for detachably assembling a battery cover on a housing. The battery cover latch mechanism includes a button, an assembly portion including two blocks positioned on the housing, a latching part positioned on the battery cover; and a resilient member secured on the button and latching to the blocks to provide a resilient force to the button. The button releasably latches to the latching part to lock the battery cover to the housing or release the battery cover from the housing.

10 Claims, 9 Drawing Sheets

BATTERY COVER LATCH MECHANISM AND PORTABLE ELECTRONIC DEVICE USING SAME

BACKGROUND

1. Technical Field

The disclosure relates to battery cover latch mechanisms used in portable electronic devices.

2. Description of Related Art

Portable electronic devices usually include latch mechanisms to latch battery covers to housings. The latch mechanisms are required to allow frequent installation and removal of batteries.

A typical latch mechanism includes a pair of hooks at one end of the battery cover and a locking pin protruding from the other end of the battery cover. The housing defines a pair of grooves and a locking hole. In assembly, the hooks are inserted into the grooves. The battery cover is pressed down to the housing until the locking pin is inserted into the locking hole. However, during disassembly, a large force is needed to remove the battery cover from the housing. Therefore, it is difficult to install or remove a battery. Another typical latch mechanism includes an ejector, a button having a latching portion configured for latching to a cover, and an elastic part latching between the button and a main body of a housing. The ejector is positioned between the main body and the cover and configured for ejecting the cover. However, the elastic part takes up too much space of the housing.

Therefore, there is a room for improvement within the art.

BRIEF DESCRIPTION OF THE DRAWINGS

Many aspects of a battery cover latch mechanism and a portable electronic device using the battery cover latch mechanism can be better understood with reference to the following drawings. The components in the drawings are not necessarily to scale, the emphasis instead being placed upon clearly illustrating the principles of the present battery cover latch mechanism and a portable electronic device using the battery cover latch mechanism. Moreover, in the drawings, like reference numerals designate corresponding parts throughout the several views.

DETAILED DESCRIPTION OF THE EMBODIMENTS

Figure 1:
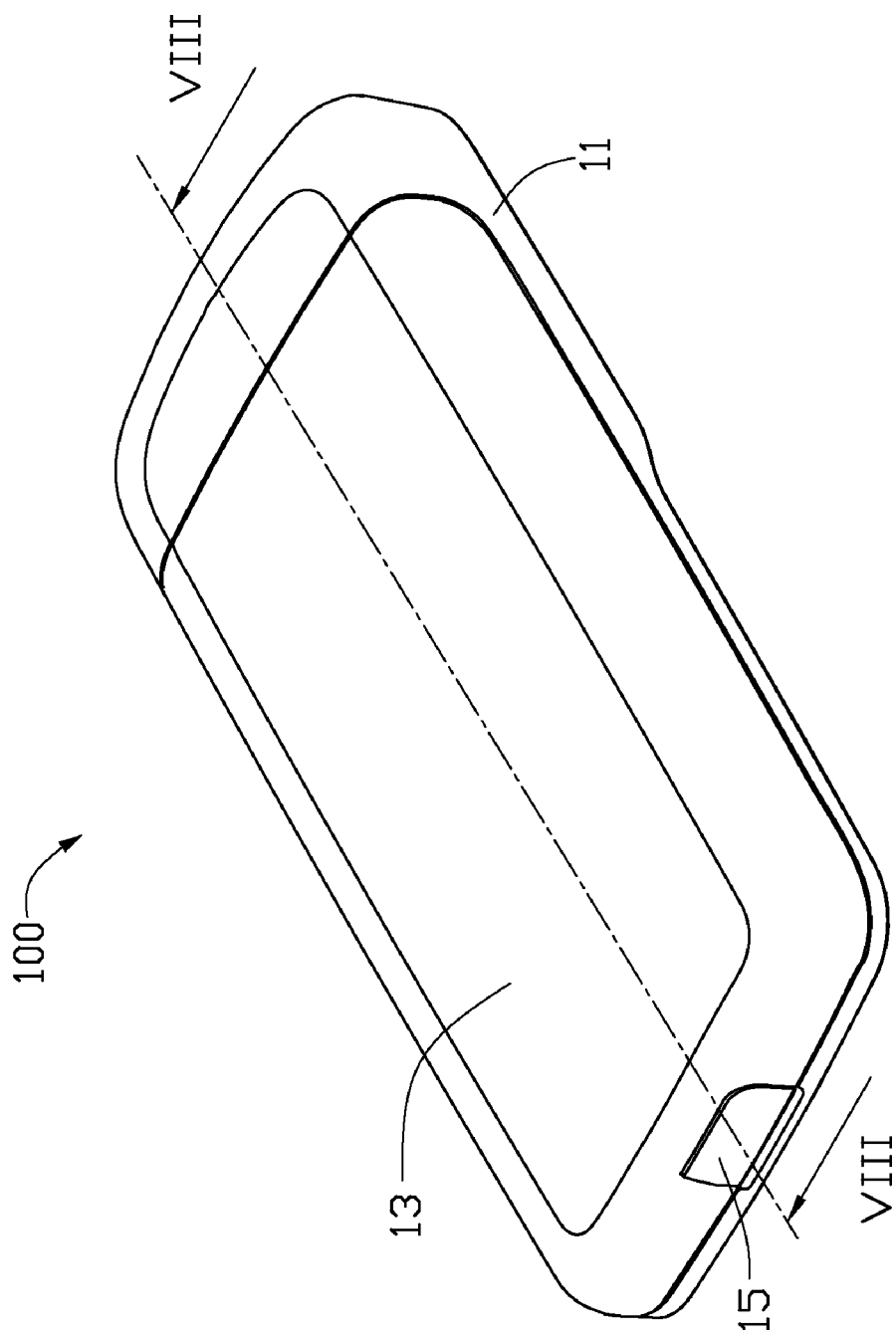
FIG. 1 is an assembled perspective view of a portable electronic device using a battery cover latching mechanism according to the exemplary embodiment.
Figure 2:
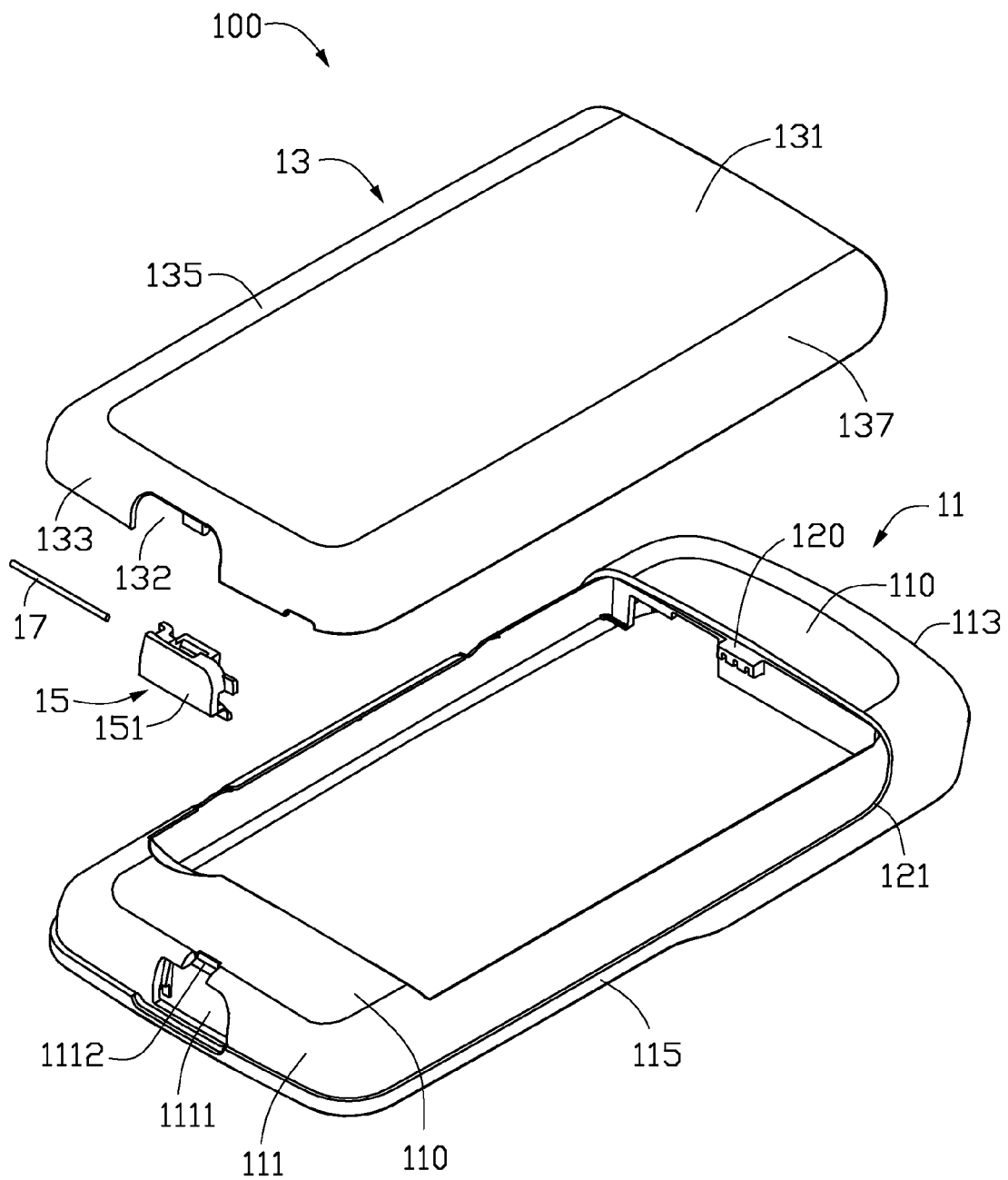
FIG. 2 is an exploded view of the portable electronic device using the battery cover latching mechanism shown in FIG. 1.
Figure 3:
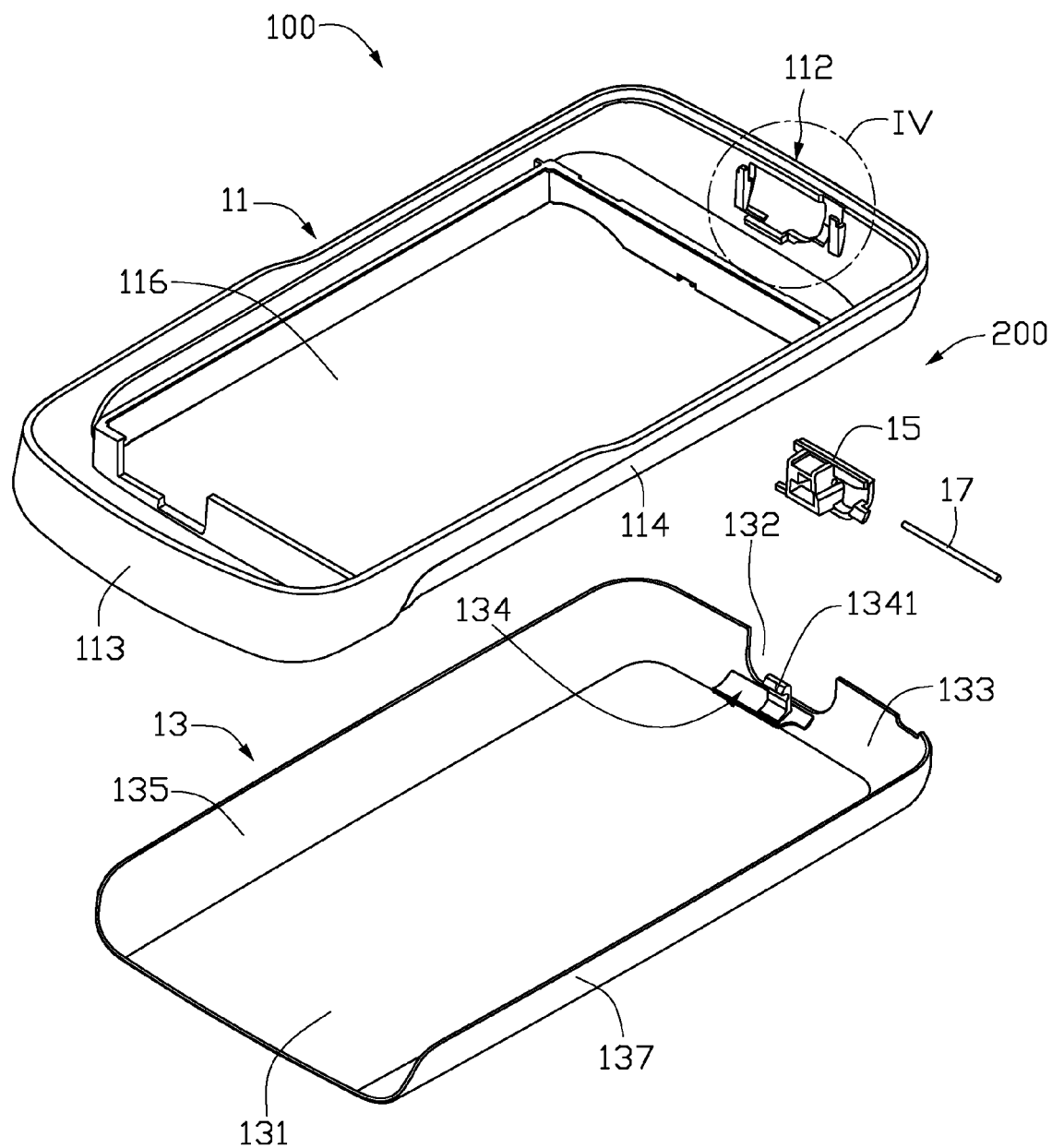
FIG. 3 is similar to FIG. 1, but viewed from another angle.

FIG. 1 to FIG. 4 show a portable electronic device 100 including a battery cover latch mechanism 200, a housing 11, and a battery cover 13. The battery cover latch mechanism 200 includes a button 15, a resilient member 17, an assembly portion 112 positioned on the housing 11, and a latching part 134 positioned on the battery cover 13.

The housing 11 includes a main body 110, a first end wall 111, a second end wall 113 opposite to the first end wall 111, a first sidewall 114, a second sidewall 115 opposite to the first sidewall 114, a receiving portion 116, a supporting portion 120, and a mating portion 121. The supporting portion 120 is positioned on the second end wall 113 and faces the first end wall 111. The mating portion 121 is a recessed portion defined on the main body 110, the first end wall 111, the first sidewall 114 and the second sidewall 115, and is configured to receive the battery cover 13.

Figure 4:
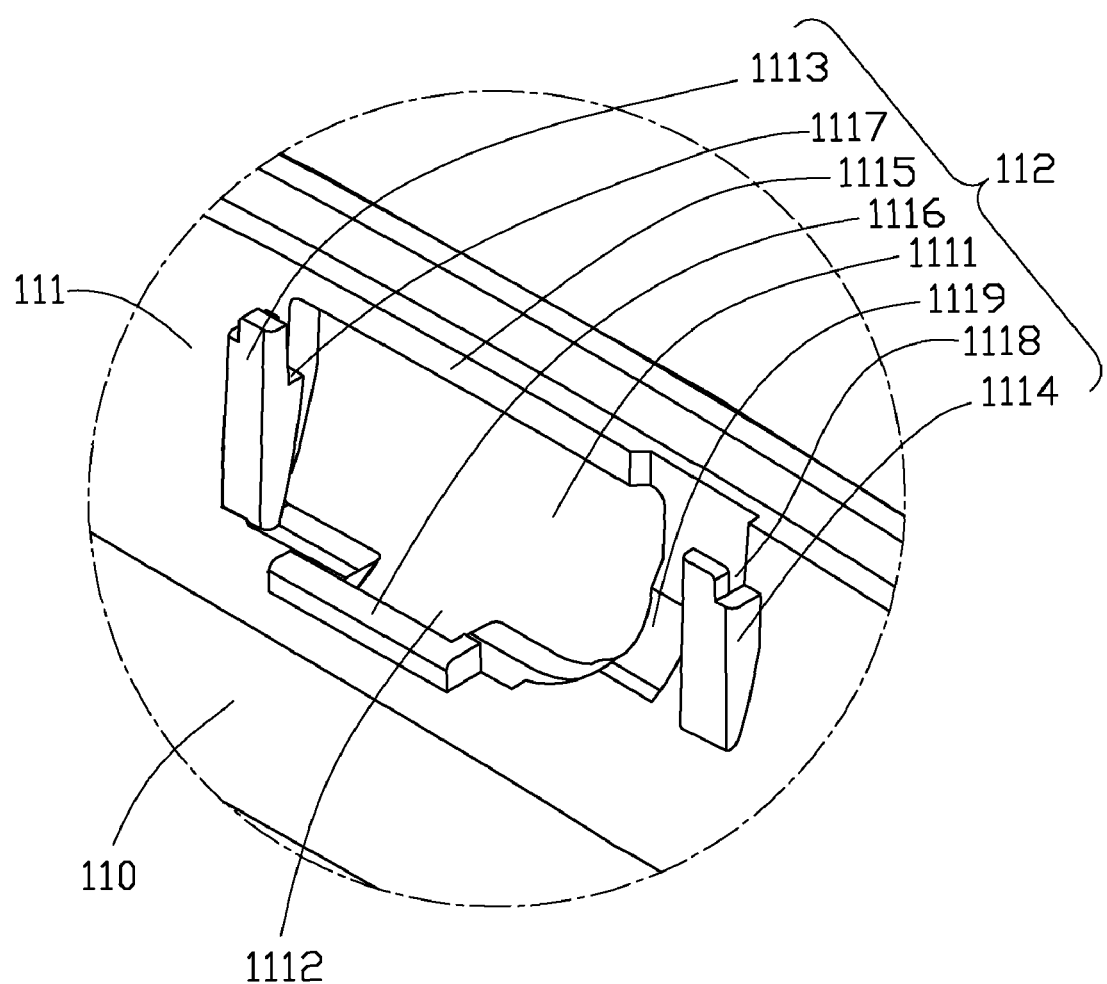
FIG. 4 is an enlarged view of a circled portion IV of FIG. 3.

Referring to FIG. 4, the assembly portion 112 is defined on the first end wall 111 of the housing 11. The assembly portion 112 includes a hole 1111, a first opening 1112, a first rib 1115, a second rib 1116, a first block 1113, a second block 1114, and a latching groove 1119. The hole 1111 is defined in the first end wall 111. The first opening 1112 is defined in a joint between the main body 110 and the first end wall 111, and communicates with the hole 1111. The first rib 1115 is positioned on the first end wall 111. The second rib 1116 is positioned on a joint between the main body 110 and the first end wall 111, and adjacent to the first opening 1112. The first rib 1115 and the second rib 1116 are parallel to each other. The first block 1113 and second block 1114 respectively extend from the first end wall 111 and are disposed at opposite ends of the hole 1111. The first block 1113 defines a first gap 1117 between the first end wall 111 and the first block 1113. The second block 1114 defines a second gap 1118 between the first end wall 111 and the second block 1114. The first gap 1117 and the second gap 1118 are configured for receiving the resilient member 17. The latching groove 1119 is defined in the first end wall 111 and located between the hole 1111 and the second block 1114.

The battery cover 13 includes a main cover 131, an end portion 133, a third sidewall 135, and an opposite fourth sidewall 137. The end portion 133 defines a second opening 132.

Figure 8:
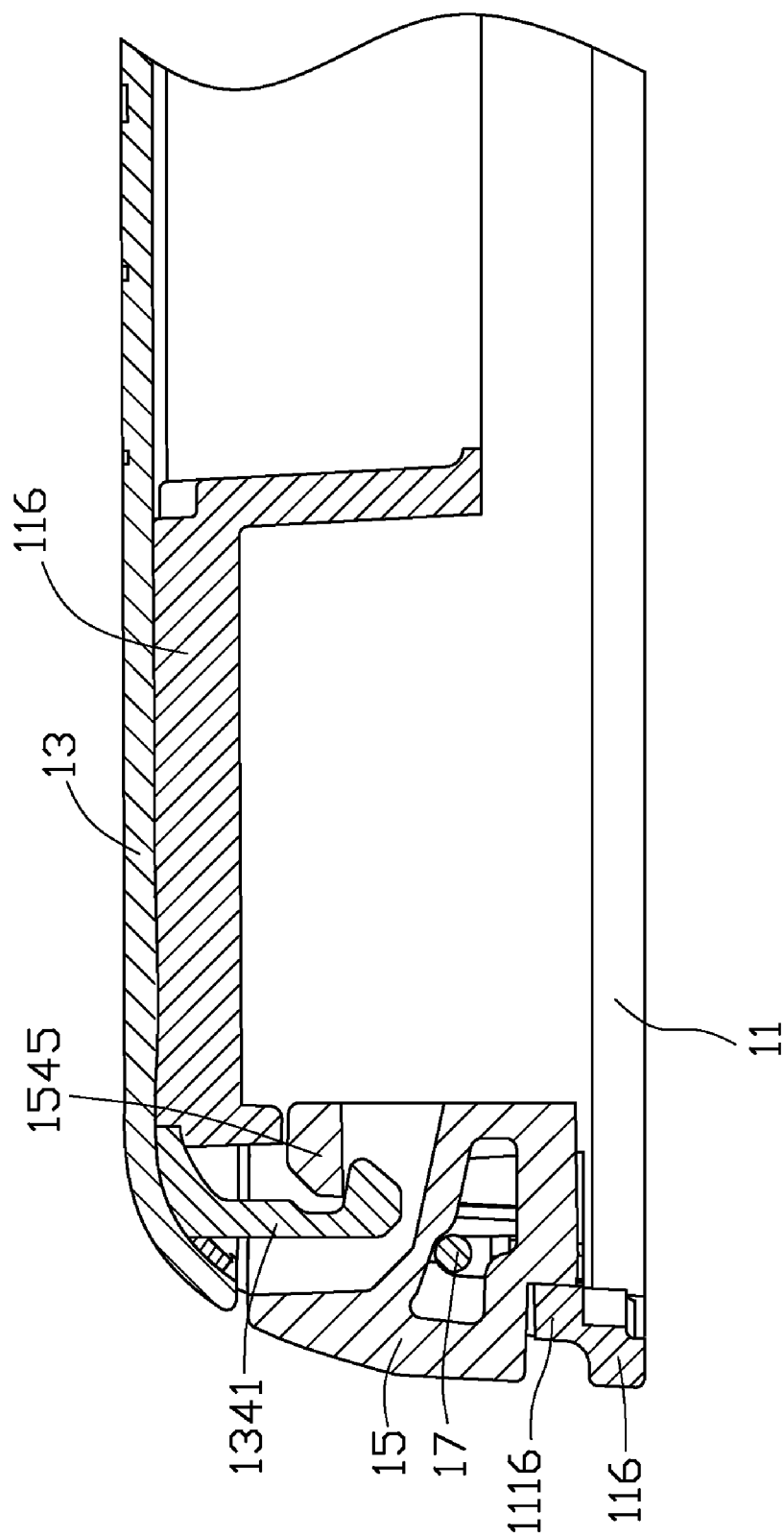
FIG. 8 is a cross-sectional view taken along line - of FIG. 1, showing the battery cover latching mechanism in locking condition.

The latching part 134 is positioned on the main cover 131 of the battery cover 13 adjacent to the second opening 132. The latching part 134 is made of elastic material and has a clasp 1341 extending from an end thereof. The clasp 1341 is configured for latching to the button 15 (FIG. 8).

Figure 5:
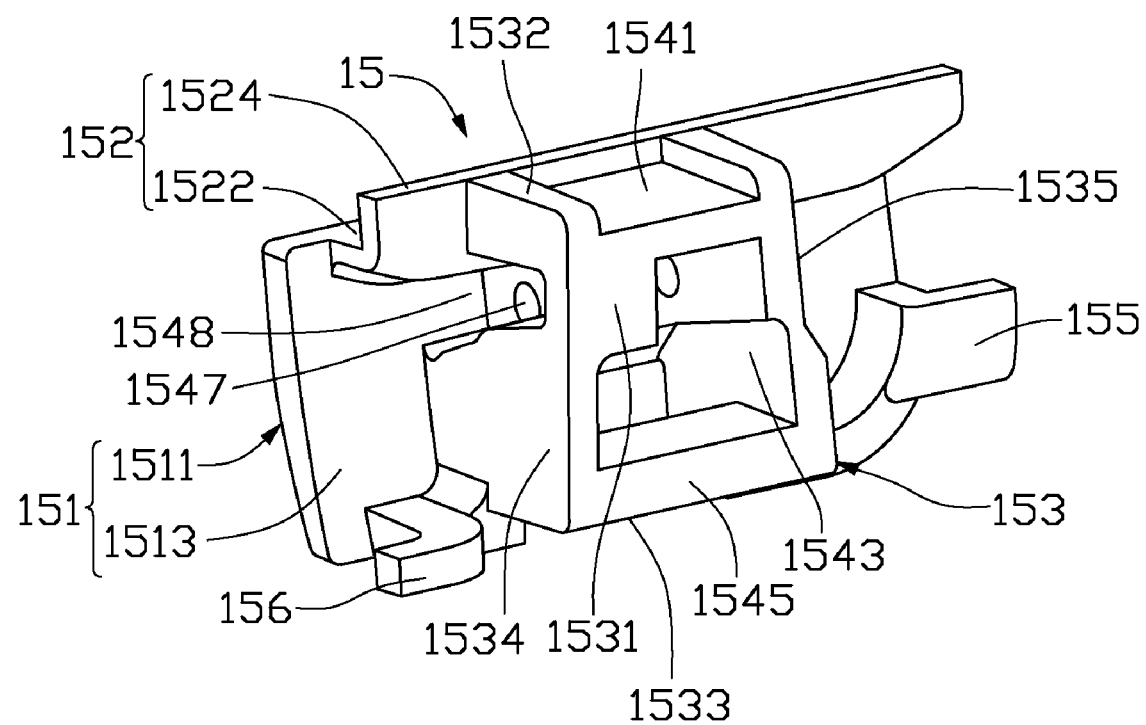
FIG. 5 is an enlarged view of a button of the battery cover latching mechanism.
Figure 6:
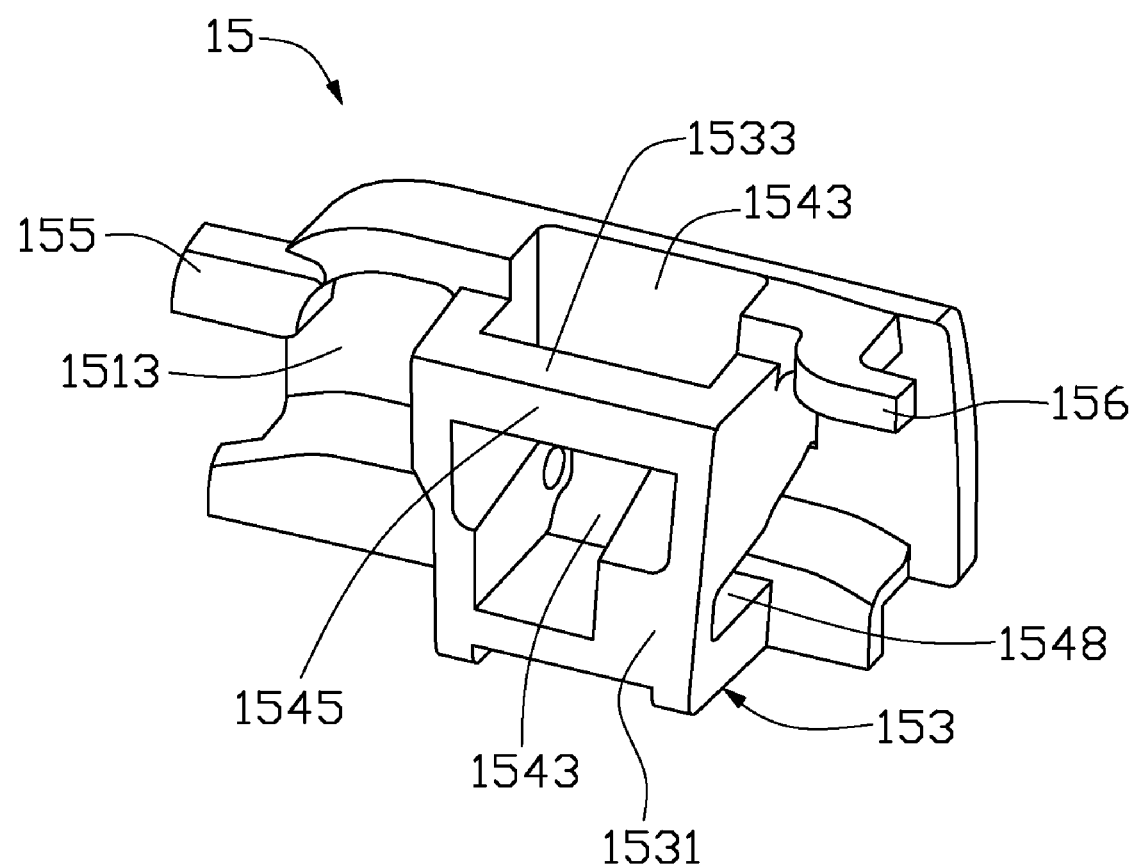
FIG. 6 is similar to FIG. 5, but viewed from another angle.

Referring to the drawings, FIG. 5 to FIG. 6, the button 15 includes a press portion 151, a latching board 152, a protrusion 153, a first lug 155, and a second lug 156. The press portion 151 includes a first press surface 1511 and an opposite second press surface 1513.

The latching board 152 is L-shaped including a connecting portion 1522 and an extending portion 1524. The connecting portion 1522 perpendicularly extends from an edge of the second press surface 1513. The extending portion 1524 is bent from an end of the connecting portion 1522 and extends away from the press portion 151. The latching board 152 is configured to resist against the first rib 1115.

The protrusion 153 is positioned on the second press surface 1513, and includes a main portion 1531 oriented away from the second press surface 1513, a first end portion 1532, a second end portion 1533 opposite to the first end portion 1532, a first side portion 1534, and a second side portion 1535 opposite to the first side portion 1534. The first end portion 1532, the second end portion 1533, the first side portion 1534 and the second side portion 1535 are adjacent to the main portion 1531. The first end portion 1532 is perpendicularly connected to an end of the extending portion 1524. The first end portion 1532 defines a recessed portion 1541 therein. The main portion 1531 defines a latching hole 1543 passing through the second end portion 1533. The latching hole 1543 is configured to receive the latching part 134. A latching post 1545 is positioned on a joint between the main portion 1531 and the second end portion 1533, and is configured to latch to the clasp 1341. The first side portion 1534 and the second side portion 1535 respectively define a recessed slot 1548. The recessed slot 1548 defines a receiving hole 1547 in a bottom thereof. The receiving hole 1547 passes through the protrusion 153. The receiving hole 1547 is configured to receive the resilient member 17.

The first lug 155 and the second lug 156 are respectively L-shaped positioned on two opposite ends of the press portion 151. The first lug 155 and the second lug 156 are respectively positioned near two sides of the protrusion 153 and away from the latching board 152. The first lug 155 and the second lug 156 are configured to engage with the first block 1113 and the latching groove 1119.

The resilient member 17 is an elastic elongated rod engagable in the receiving hole 1547, the first gap 1117 and the second gap 1118. The resilient member 17 is configured for providing elastic force to the button 13.

Figure 7:
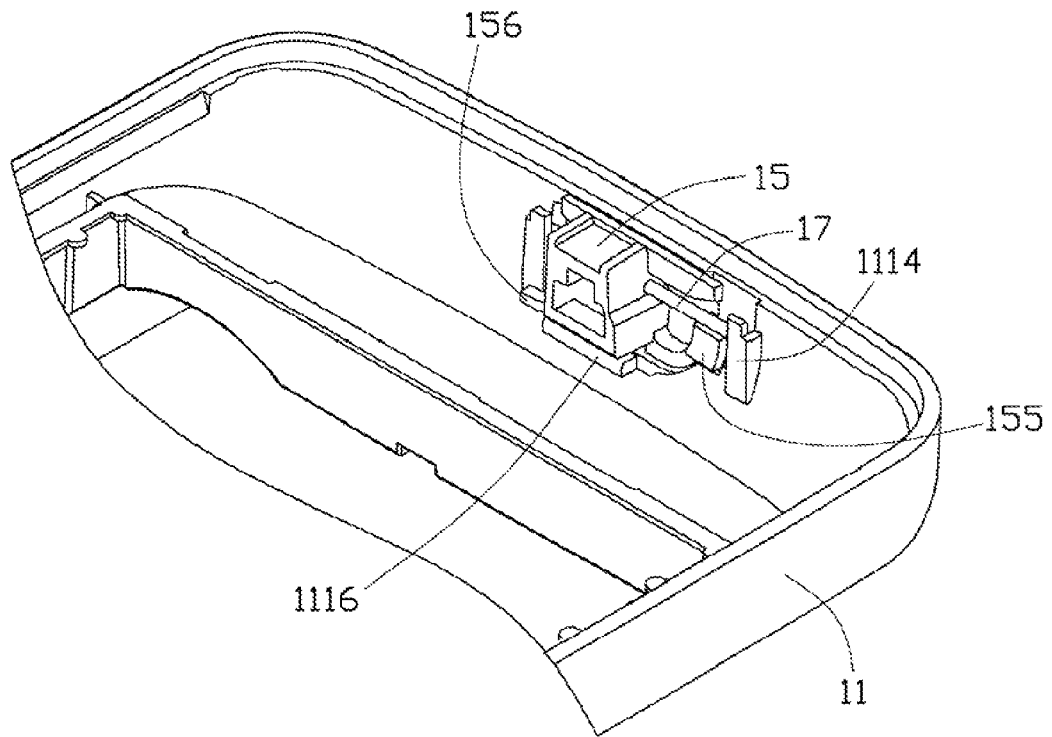
FIG. 7 is an assembled perspective view of portable electronic device using the battery cover latching mechanism, showing the button attached to the assembly portion of the housing.

Referring to FIG. 7, in assembly, the resilient member 17 passes through the receiving hole 1547. The button 15 is placed into the hole 1111 of the assembly portion 112. The first press surface 1511 of the button 15 is exposed from the housing 11. The second end portion 1533 of the protrusion 153 resists the second rib 1116 of the assembly portion 112. The latching hole 1543 communicates with the first opening 1112 of the assembly portion 112. The latching board 152 resists the first rib 1115. Each end of the resilient member 17 engages with the first block 1113 and the second block 1114. The first lug 155 and the second lug 156 respectively engage with the first block 1113 and the latching groove 1119.

Referring to FIG. 8, the battery cover 13 is assembled on the mating portion 121 of the housing 11. The latching part 134 of the battery cover 13 passes through the first opening 1112 and the clasp 1341 latches to the latching post 1545 for latching the battery cover 13 to the housing 11.

Figure 9:
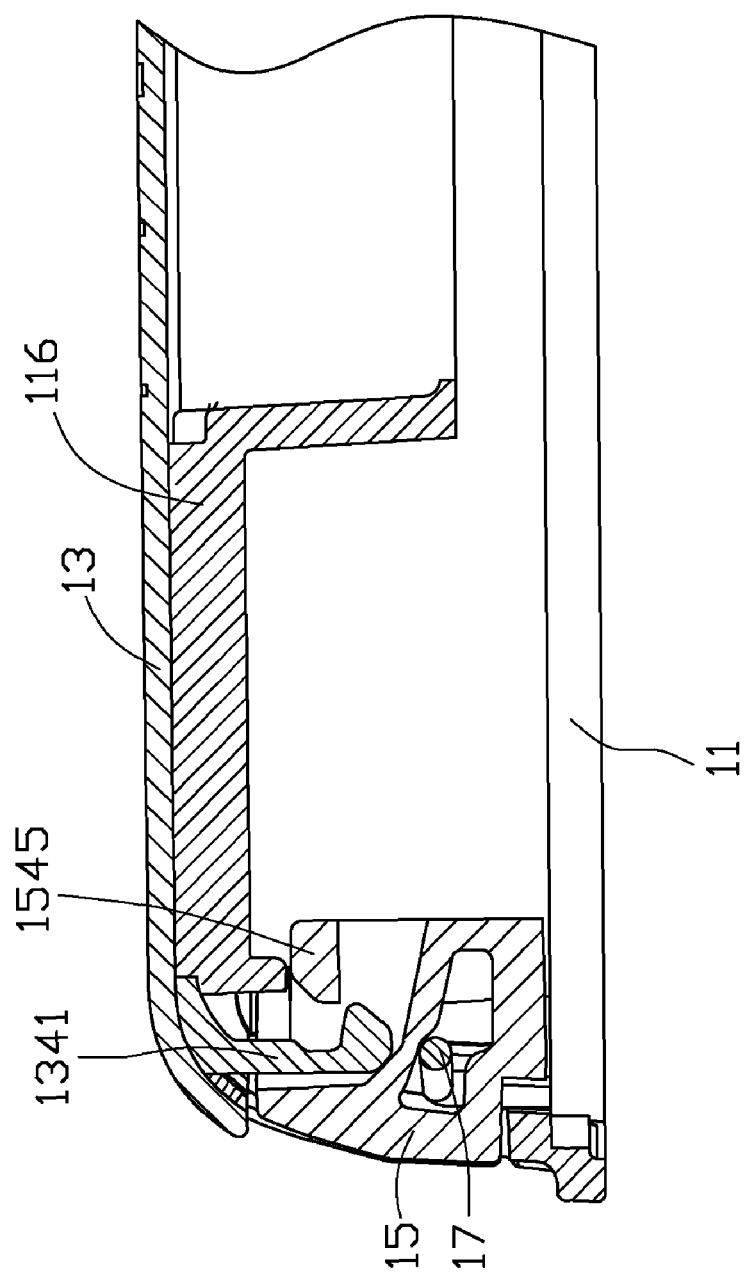
FIG. 9 is a cross-sectional view taken along line VIII-VIII of FIG. 1, showing the battery cover latching mechanism in unlocking condition.

Referring to FIG. 9, when the battery cover 13 is detached from the housing 11, the press portion 151 of the button 15 is pressed by an external force, the button 15 and the resilient member 17 move to an interior of the housing 11. Thereby, the clasp 1341 of the battery cover 13 is released from the latching post 1545 of the button 15. The battery cover 13 is detached from the housing 11. Meanwhile, the resilient member 17 is resiliently deformed. When the external force is removed, the resilient member 17 restores to drive the button 15 to its original state.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover latch mechanism configured for detachably assembling a battery cover on a housing, the battery cover latch mechanism comprising:
   a button including a protrusion defining a latching hole and a latching post, wherein the button comprises a press portion and the protrusion positioned on the press portion, the protrusion includes a main portion and an end portion adjacent to the main portion, the main portion defines the latching hole passing through the end portion;
   an assembly portion defining a hole and comprising two blocks positioned on the housing, the button received in the hole;
   a latching part positioned on the battery cover, the latching part having a clasp; and
   a resilient member being an elastic elongated rod and having a middle portion enclosed by the button and two opposite ends, each of the opposite ends lying along the same longitudinal axis as the middle portion of the elastic elongated rod and engaging with the blocks to provide a resilient force to the button, the elastic elongated rod rotatable relative to the blocks; wherein the latching part passes through the latching hole of the button, and the clasp releasably latches to the latching post to lock the battery cover to the housing or release the battery cover from the housing.

2. The battery cover latch mechanism as claimed in claim 1, wherein the protrusion defines a receiving through hole, each of two blocks defines a first gap and a second gap, the middle portion of the resilient member is enclosed the receiving hole, the opposite ends of the resilient member engage in the first gap and the second gap.

3. The battery cover latch mechanism as claimed in claim 1, wherein a first rib is positioned on the housing, and a second rib is positioned on the housing opposite to the first rib, the button resists the first rib and the second rib.

4. The battery cover latch mechanism as claimed in claim 3, wherein the button further comprises a latching board including a connecting portion perpendicularly extending from an edge of the press portion and an extending portion bent from an end of the connecting portion, the latching board resisting the first rib, the latching post resisting the second rib.

5. The battery cover latch mechanism as claimed in claim 4, wherein the assembly portion further comprises a latching groove defining in the housing and located between the hole and one of the blocks, the button further comprising two lugs respectively positioned on two ends of the press portion, the lugs configured for engaging with the one of the blocks and the latching groove.

6. A battery cover latch mechanism configured for detachably assembling a battery cover on a housing, the battery cover latch mechanism comprising:
   a first rib positioned on the housing, and a second rib positioned on the housing opposite to the first rib, the button resisting the first rib and the second rib;
   a button comprising a protrusion defining a receiving hole, a latching hole and a latching post; wherein the button further comprises a latching board including a connecting portion perpendicularly extending from an edge of the button and an extending portion bent from an end of the connecting portion, the latching board resisting the first rib, the latching post resisting the second rib;
   an assembly portion positioned on the housing, the assembly portion defining a hole therein and two blocks respectively positioned on two sides of the hole, the button received in the hole;
   a latching part positioned on the battery cover; the latching part having a clasp, the latching part passing through the latching hole and the clasp releasably latching to the latching post; and
   a resilient member being an elastic elongated rod, a middle portion of the resilient member enclosed in the receiving hole and two opposite ends of the resilient member engaging with the blocks to provide a resilient force to the button.

7. The battery cover latch mechanism as claimed in claim 6, wherein each of two blocks defines a first gap and a second gap configured for receiving the opposite ends of the resilient member.

8. A portable electronic device, comprising:
a housing;
a battery cover;
a battery cover latch mechanism, comprising:
  a button including a protrusion defining a latching hole and a latching post;
  an assembly portion defining a hole and comprising two blocks, a first rib and a second rib positioned on the housing, the button received in the hole;
  a latching part positioned on the battery cover, the latching part having a clasp; and
  a resilient member secured on the button and engaging with the blocks to provide a resilient force to the button;
wherein the latching part passes through the latching hole of the button, and the clasp releasably latches to the latching post to lock the battery cover to the housing or release the battery cover from the housing;
wherein the button further comprises a latching board including a connecting portion perpendicularly extending from an edge of the button and an extending portion bent from an end of the connecting portion, the latching board resisting the first rib, the latching post resisting the second rib.

9. The portable electronic device as claimed in claim 8, wherein the button comprises a press portion and a protrusion positioned on the press portion, the protrusion includes a main portion and an end portion adjacent to the main portion, the main portion defines the latching hole passing through the end portion.

10. The portable electronic device as claimed in claim 9, wherein the assembly portion further comprises a latching groove defining in the housing and located between the hole and one of the blocks, the button further comprising two lugs respectively positioned on two ends of the press portion, the lugs configured for engaging with the blocks and the latching groove.

* * * * *